United States Patent [19]
DiBattista et al.

[11] 4,278,245
[45] Jul. 14, 1981

[54] APPARATUS FOR CLAMPING A PLURALITY OF ELEMENTS

[75] Inventors: Dante P. DiBattista, Lynn; Robert H. Kuhn, Topsfield, both of Mass.

[73] Assignee: General Electric Company, Lynn, Mass.

[21] Appl. No.: 97,010

[22] Filed: Nov. 23, 1979

[51] Int. Cl.³ .............................................. B25B 11/00
[52] U.S. Cl. ................................ 269/22; 204/224 M; 269/266; 279/1 D
[58] Field of Search ................ 269/22, 266; 279/1 D; 204/224 M

[56] References Cited

U.S. PATENT DOCUMENTS

| | | | |
|---|---|---|---|
| 2,673,227 | 3/1954 | Hubert | 269/22 |
| 3,467,592 | 9/1969 | Eisberg | 204/224 M |
| 3,663,027 | 5/1972 | Klipping | 279/1 D X |
| 4,047,709 | 9/1977 | Thyberg | 269/22 |
| 4,088,312 | 5/1978 | Frosch et al. | 269/266 X |

Primary Examiner—Robert C. Watson
Attorney, Agent, or Firm—Henry J. Policinski; Derek P. Lawrence; Donald W. Walk

[57] ABSTRACT

Apparatus for releasably clamping a plurality of elements, such as electrodes associated with an electrical machine, are provided wherein a housing generally defines a cavity with at least one of the elements protruding into the cavity. A fluid medium adapted for hydrostatic pressurization is disposed within the cavity and means are provided which are also disposed within the cavity and responsive to hydrostatic pressurization of the medium for generating a force for clamping the element.

8 Claims, 4 Drawing Figures

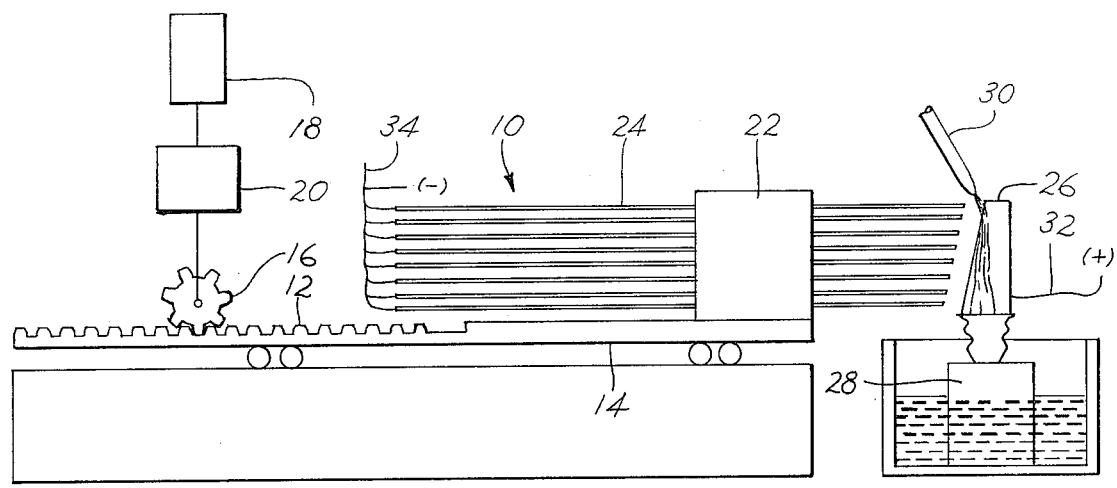
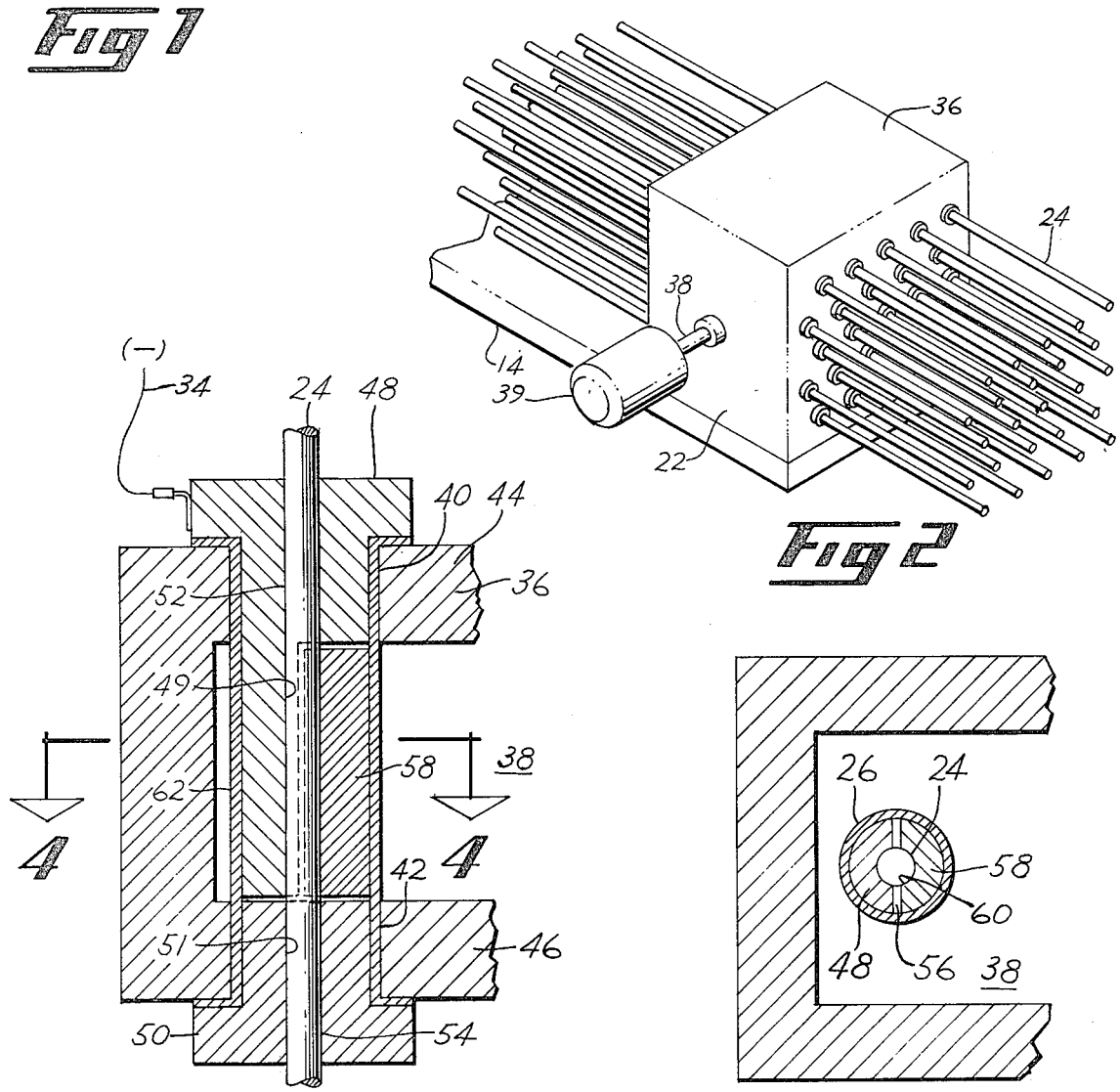

4,278,245

APPARATUS FOR CLAMPING A PLURALITY OF ELEMENTS

The Government has rights in this invention pursuant to Contract No. N00019-76-C1261 awarded by the Department of the Navy.

BACKGROUND OF THE INVENTION

The present invention relates to apparatus for clamping a plurality of elements and, more particularly, to such apparatus as are used for clamping a plurality of electrodes in an electrical discharge machine used for simultaneously machining a plurality of small holes in a workpiece.

Electrical discharge machines have been used in the past to simultaneously machine a plurality of small holes in a wide variety of workpieces. These machines utilize a series of controlled electrical discharges to remove metal from the surface of the workpiece. More specifically, each of the discharges cause a minute amount of metal to rapidly heat up, melt and partially vaporize. The pressure of the metal vapor expels the liquid metal from the surface of the workpiece and into flowing dielectric fluid which carries the minute amount of metal away from the workpiece. The controlled electrical discharges occur at a rate or frequency, typically 15,000 to 30,000 per second, to continuously remove metal from the site. As metal is continuously removed, a depression is formed and the electrode used in generating the discharge is moved closer to the workpiece to maintain a selected discharge gap. In this manner then metal is removed from the site until the desired amount of metal is electrically machined away.

It is known in the art to employ a plurality of mutually insulated electrodes to simultaneously machine away metal at a number of closely proximate sites. This type of electrical discharge machine apparatus comprises a cluster, or plurality, of mutually insulated electrodes clamped onto and carried by a cartridge and selectively advanced as a group toward the workpiece. During the electrical discharge machining operation material is removed or eroded from the electrode as well as the workpiece. Erosion of the electrode tips during the machining operation may not be uniform amongst electrodes. Consequently, at the end of the machining operation, in order to achieve satisfactory operation during the next subsequent machining operation, the electrode tips must be placed in the same alignment as they exhibited at the start of the machining operation. Realignment of the electrode tips, or refeed as it is commonly known in the art, has been accomplished by releasing the clamp securing the electrodes to the cartridge, advancing selected electrodes toward the workpiece until the electrode tips are aligned in the desired relationship and reclamping the electrodes in the cartridge.

In the past, prior art apparatus for realigning or refeeding the electrode tips have met with generally successful results in realigning electrodes which lie generally parallel in the same plane. With the electrodes arranged to lie in the same plane, the clamps used to secure the electrodes to the cartridge may be very simply comprised of a pair of flat plate members or a pair of rollers between which the electrodes are gripped. However, prior art structures have not been completely successful in providing for realignment where the electrodes do not lie in the same plane but rather are disposed in a three dimensional array. The present invention addresses the problems posed by realignment of electrodes arranged in a three dimensional array.

SUMMARY OF THE INVENTION

Therefore, it is an object of the present invention to provide means for releasably clamping a plurality of elements. It is another object of the present invention to provide means for releasably clamping electrodes in an electrical discharge machining operation.

It is still another object of the present invention to provide means for releasably clamping electrodes arranged in a three dimensional array.

Briefly stated, these and other objectives which will become apparent hereinafter are accomplished by the present invention which, in one form, provides apparatus for clamping a plurality of elements including a housing generally defining a cavity with at least one of the elements protruding into the cavity. A fluid medium adapted for hydrostatic pressurization is disposed within the cavity and means are provided which are also disposed within the cavity and responsive to hydrostatic pressurization of the medium for generating a force for clamping the element.

DESCRIPTION OF THE DRAWINGS

While the specification concludes with claims distinctly claiming and particularly pointing out the present invention described herein, the invention will be more readily understood by reference to the following description and the appended drawings in which:

FIG. 1 is a schematic representation of electrical discharge machining apparatus.

FIG. 2 is an enlarged schematic view of a portion of the apparatus depicted in FIG. 1.

FIG. 3 is an enlarged schematic view of a portion of the apparatus depicted in FIG. 2.

FIG. 4 is a cross sectional view taken along the lines 4—4 of FIG. 3.

DESCRIPTION OF THE PREFERRED EMBODIMENTS

Referring now to FIG. 1, schematically depicted at 10 is electrical discharge machining apparatus including the present invention. A gear rack 12, connected to a moveable table or carriage 14, is adapted to be driven by gear 16 in accordance with motive power provided by motor 18 through gear box 20. Fixedly secured to carriage 14, a selectively releasable electrode clamp 22 receives a plurality of electrodes 24 which extend through clamp 22 to a location proximate workpiece 26. Workpiece 26 is supported during the machining operation upon fixed support block 28 and is bathed in a flow of dielectric fluid dispensed from nozzle 30. The workpiece 26 is electrically connected by lead 32 to a positive terminal and the electrical circuit is completed by electrically connecting each electrode 24 to a negative terminal through leads 34.

Typically during operation of the apparatus 10, the motor 18 advances carriage 14 toward workpiece 26. When the tips of each of the electrodes 24 reach a predetermined distance or gap from workpiece 26, electrical discharge machining is initiated through energization of the electrical circuit to remove metal from the workpiece 26. As metal is removed from the workpiece 26, the motor 18 advances carriage 14 and electrodes 24 toward the workpiece 26 so as to maintain the aforementioned gap between each of the tips of electrodes 24 and workpiece 26. In this manner, then, machining of workpiece 26 is accomplished until the desired amount of metal is removed and thence the motor 18 is effective to withdraw the carriage 14 and the electrodes 24 away from the workpiece 26.

Since uneven electrode erosion occurs during the machining operation the tips of electrodes 24 will not be in alignment after the operation has been completed. In order to achieve simultaneous initiation of electrical discharge machining at all electrode tips during the next subsequent operation, the electrode tips must be aligned. Alignment is accomplished by sufficiently releasing clamp 22 from its firm grip on electrodes 24 to a degree permitting electrodes 24 to be carried by clamp 22 but yet be slideably translatable with respect thereto.

The carriage 14, and clamp 22, are then advanced toward the new workpiece (or a reference surface). Since electrodes 24 are loosely carried by clamp 22, they are also advanced toward new workpiece. During such advancement, a first electrode tip will contact the new workpiece (or a reference surface), preventing further advancement of that electrode and causing that electrode to slip with respect to clamp 22 as clamp 22 is advanced further. Further advancement brings a second electrode tip into contact with workpiece 26, causing that electrode 24 to slip with respect to clamp 22. In this manner then, each of the electrodes 24 is brought into contact with the new workpiece. When the last electrode 24 is brought into contact the electrodes are in alignment and clamp 22 is effective to firmly regrip all of the electrodes 24 so as to prevent any relative movement between clamp 22 and electrodes 24. The carriage 14, and hence electrodes 24, are then slightly retracted from the workpiece to provide the aforementioned dielectric gap, and electrical discharge machining of the new workpiece may then be accomplished.

Referring now to FIG. 2, an enlarged schematic view of a portion of the carriage 14 and clamp 22 shown in FIG. 1 is depicted. Clamp 22 is comprised of a hollow, generally fluid tight, housing 36 for supporting electrodes 24 and adapted to receive a hydrostatically pressurized medium such as a fluid via conduit 38 connected to a source for hydrostatic pressurization in the form of pump 39. It is observed that the plurality of electrodes 24 are disposed in a three dimensional array. As will be described hereinafter, by selectively pressurizing the medium or fluid within housing 36, clamping of the three dimensional array of electrodes 24 may be achieved.

Referring now to FIG. 3, an enlarged schematic representation of a portion of one of the electrodes 24 is depicted in relation to the housing 36. Housing 36 generally circumscribes a cavity 38 in which the aforementioned fluid medium is retained. Housing 36 includes a pair of opposing aligned apertures 40 and 42, extending respectively, through a pair of generally parallel walls 44 and 46 in housing 36. Cylindrical elongated rigid hollow member or collet 48 extends through aperture 40, across cavity 38 and terminates adjacent aperture 42 of wall 46. A second cylindrical rigid hollow member or collet 50 resides in aperture 42 of wall 46. Collets 48 and 50, which may be made of one piece construction, include inner surfaces 49 and 51, respectively, which define generally centrally located elongated passages 52 and 54, respectively, aligned with each other and adapted to receive and surround a single electrode 24 extending through housing 36. It should be noted that passages 52 and 54 are of a diameter slightly larger than the diameter of electrode 24.

Referring now to FIG. 4 in conjunction with FIG. 3 it is observed that rigid member or collet 48 includes a relieved portion 56 in which a moveable insert or segment 58 is received. Insert 58 includes an inner surface 60 which defines a portion of passage 52 and is configured to be complimentary to the shape of electrode 24 for engagement therewith.

Moveable or flexible means in the form of a hollow, cylindrical, thin-walled, flexible member or diaphragm 62 is disposed between the fluid medium in cavity 38 and electrode 24. More specifically, diaphragm 62 is adapted to snugly fit around and is generally co-axial with rigid members 48 and 50 and extends through aperture 40 across cavity 38 and through aperture 42. It is observed that flexible diaphragm 62 is, at its ends, trapped between collet 48 and the wall 44 of aperture 40 and between collet 50 and the wall 46 of aperture 42. Entrapped in this manner, diaphragm 62 provides a seal preventing the leakage of the fluid medium out of cavity 38 through apertures 40 and 42 and passages 52 and 54. Furthermore, flexible diaphragm 62 is comprised of an electrically insulated material and, since it separates collets 48 and 50 from housing 36, prevents the passage of electricity between housing 36 and collets 48 and 50. In this manner, each electrode 24 is electrically insulated from other electrodes 24.

Diaphragm 62, impervious to the passage of the fluid medium therethrough, provides a barrier means disposed between electrode 24 and the medium in cavity 38. It is observed that electrode 24 is surrounded by rigid members 48 and 50 each disposed between the electrode 24 and flexible diaphragm 62. Diaphragm 62 precludes members 48 and 50 and electrode 24 from direct contact with the fluid medium in cavity 38.

The operation of the present invention will now be described. When the electrical discharge machining process is in that portion of the machining sequence in which clamping of the electrodes is desired, the medium in cavity 38 is hydrostatically pressurized. Flexible member or diaphragm 62 is responsive to hydrostatic pressurization for generating a force and for transmitting the force to electrode 24 for clamping electrode 24. More specifically due to the pressure of the medium in cavity 38 acting on the surface of diaphragm 62 a force is generated in a direction toward electrode 24. Since diaphragm 62 is flexible, it moves or flexes proximate relieved portion 56 of collet 48 in a direction toward electrode 24. Flexing in this manner, diaphragm 62 engages insert 58 in relief 56 and moves insert 58 in a direction toward electrode 24 whereby surface 60 of insert 58 engages electrode 24. Thus, the pressure of the fluid medium in cavity 38 acting on the surface of diaphragm 62 generates a force to flex diaphragm 62. Insert 58 is moveable in response to flexing of diaphragm 62 to clamp electrode 24 between surface 60 of insert 58 and the inner wall 49 of collet 48. In this manner, then, the electrode is firmly held against movement relative to housing 36. It should be noted that clamping of electrode 24 against inner wall 49 of collet 48, which is electrically connected to lead 34, provides extended surface contact between electrode 24 and collet 48. This surface contact provides excellent electrical contact between collet 48 and electrode 24 so as to complete the aforementioned electrical circuit. As previously mentioned, the flexible member 62, electrically insulates each electrode from the other. This feature is important since it is a practice in the field to verify the electrical integrity of each electrode and its circuit. Hence, since each electrode circuit is electrically isolated from the others, its integrity may be verified despite a malfunction of an adjacent electrode circuit.

When the electrical discharge machining apparatus is in that portion of the machining sequence in which unclamping of the electrodes 24 is desired, the hydrostatic pressurization of the fluid medium in cavity 38 is removed. Depressurization removes the force upon flexible diaphragm 62 which permits insert 58 to release its clamping engagement of electrode 24. With cavity 38 depressurized, sliding movement of the plurality of electrodes 24 with respect to housing 36 may occur and the plurality of electrodes 24 may be aligned as hereinbefore described.

It is within the scope of the present invention to provide each electrode, of the three dimensional array depicted in FIG. 2, with the clamping apparatus depicted in FIGS. 3 and 4. With such an arrangement, each of the plurality of electrodes 24 may be simultaneously and efficiently clamped by simply hydrostatically pressurizing the fluid medium in cavity 38. Since each electrode of the plurality is provided with the aforementioned collets, insert and flexible diaphragm and is acted upon by a common fluid medium, the magnitude of clamping force generated at each electrode is independent of the clamping force of other electrodes in the array. This feature is a significant improvement over prior art devices wherein tolerance variations between the electrodes and the common clamping apparatus would result in an interdependency between the magnitude of clamping force generated at the various electrodes. With such prior art devices, the tolerance variations would result in high clamping force at some of the electrodes and little or no clamping force at other electrodes in the array. Hence the present invention provides a significant improvement over prior art devices.

While the preferred embodiment of the present invention has been described and depicted, it will be appreciate by those skilled in the art that modifications, substitutions and changes may be made thereto without departing from the scope of the invention as set forth in the Appended Claims.

We claim:

1. Apparatus for clamping a plurality of electrodes, said apparatus comprising:
   a housing defining a cavity, said plurality of electrodes extending through said cavity;
   a medium adapted for pressurization disposed within said cavity;
   means disposed within said cavity comprising a hollow cylindrical rigid member for receiving and surrounding each said electrodes and disposed between each electrode and said medium, said cylindrical rigid member including a relieved portion having an insert therein, said insert being movable against said electrode toward said rigid member in response to said pressurization of said medium for thereby clamping said electrode between said insert and said rigid member.

2. The apparatus of claim 1, further comprising flexible barrier means disposed between said rigid member and insert and said medium, said barrier means being impervious to the passage of said medium therethrough.

3. The invention as set forth in claim 2, wherein said flexible barrier means comprises a hollow cylindrical member surrounding said rigid member and insert.

4. Apparatus for clamping a plurality of electrodes, said apparatus comprising:
   a housing defining a cavity, said plurality of electrodes extending through said cavity;
   a medium adapted for hydrostatic pressurization disposed within said cavity;
   means disposed within said cavity comprising a hollow cylindrical rigid member for receiving and surrounding each said electrodes and including a relieved portion having an insert therein; and
   a hollow cylindrical flexible member surrounding each said rigid member and insert and forming a barrier between said rigid member and insert and said medium, said barrier being impervious to the passage of said medium therethrough, and wherein said insert is movable against said electrode and toward said rigid member in response to said hydrostatic pressurization of said medium acting on said barrier for thereby clamping said electrode between said insert and said rigid member.

5. Apparatus for clamping a plurality of rod elements comprising:
   a housing defining a cavity and having at least one side wall including a plurality of apertures for receiving said rod elements;
   a medium adapted for pressurization disposed within said cavity; and
   clamping means for said rod elements comprising a plurality of rigid tubular members each within said cavity and fixedly attached to said housing in axial alignment with one of said side wall apertures and including a cutout through the side thereof; and
   a slidable insert positioned in each said cutout, said slidable insert being radially movable for clamping a rod element in a respective rigid tubular member in response to forces exerted thereon as a result of pressurization of said medium.

6. The apparatus of claim 5, wherein said clamping means further comprises a plurality of flexible tubular members each separating a respective rigid tubular member and insert from said medium and being impervious to the passage of said medium therethrough.

7. The apparatus of claim 5, wherein said housing further comprises a pair of opposing sidewalls each including a plurality of apertures receiving respective ends of and positioning said rigid tubular members in said cavity in parallel alignment, and a plurality of flexible tubular members each extending between said side walls and separating a respective rigid tubular member and insert from said medium and being impervious to the passage of said medium therethrough.

8. The apparatus of claim 7, wherein said flexible tubular member is electrically insulative and extends through aligned apertures in said opposing sidewalls whereby said flexible tubular member electrically insulates said rigid tubular member and insert from said housing and medium.

* * * * *